United States Patent
Boggs et al.

(10) Patent No.: US 9,641,545 B2
(45) Date of Patent: ***May 2, 2017

(54) METHODS, SYSTEMS, AND COMPUTER PROGRAM PRODUCTS FOR DETECTING COMMUNICATION ANOMALIES IN A NETWORK BASED ON OVERLAP BETWEEN SETS OF USERS COMMUNICATING WITH ENTITIES IN THE NETWORK

(71) Applicant: AT&T INTELLECTUAL PROPERTY I, L.P., Atlanta, GA (US)

(72) Inventors: Nathaniel Boggs, New York, NY (US); Wei Wang, Hoboken, NJ (US); Baris Coskun, Weehawken, NJ (US); Suhas Mathur, Bayonne, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,744

(22) Filed: Oct. 26, 2015

(65) Prior Publication Data
US 2016/0044056 A1    Feb. 11, 2016

Related U.S. Application Data

(63) Continuation of application No. 13/784,410, filed on Mar. 4, 2013, now Pat. No. 9,203,856.

(51) Int. Cl.
G06F 15/173    (2006.01)
H04L 29/06    (2006.01)
H04L 12/24    (2006.01)
H04W 12/12    (2009.01)

(52) U.S. Cl.
CPC .......... *H04L 63/1425* (2013.01); *H04L 41/14* (2013.01); *H04L 63/1416* (2013.01); *H04W 12/12* (2013.01)

(58) Field of Classification Search
USPC .................. 726/25; 706/21, 46; 600/481
See application file for complete search history.

(56) References Cited

U.S. PATENT DOCUMENTS 6,601,048 B1    7/2003    Gavan et al.
7,031,693 B2    4/2006    Ohrstrom et al.
(Continued)

OTHER PUBLICATIONS

Yen et al., "Traffic aggregation for malware detection," In DIMVA '08: Proceedings of the 5th International Conference on Detection of Intrusions and Malware, and Vulnerability Assessment (2008).
(Continued)

*Primary Examiner* — Quang N Nguyen
(74) *Attorney, Agent, or Firm* — Akerman LLP; Michael K. Dixon; Mammen (Roy) P. Zachariah, Jr.

(57) ABSTRACT

Anomalies are detected in a network by detecting communication between a plurality of entities and a set of users in the network, determining an overlap between subsets of the set of users that the entities comprising the plurality of entities communicated with, respectively, and determining whether the communication between the plurality of entities and the set of users is anomalous based on the overlap.

20 Claims, 4 Drawing Sheets

(56) References Cited

U.S. PATENT DOCUMENTS

| | | | |
|---|---|---|---|
| 7,225,013 B2* | 5/2007 | Geva | A61B 5/04012 600/481 |
| 7,280,999 B2 | 10/2007 | Chung et al. | |
| 7,587,210 B2 | 9/2009 | Sweatman et al. | |
| 7,823,204 B2 | 10/2010 | Gupta et al. | |
| 8,239,944 B1 | 8/2012 | Nachenberg et al. | |
| 8,892,484 B2* | 11/2014 | Sipple | G06N 7/005 706/21 |
| 8,965,823 B2* | 2/2015 | Sohn | G08B 31/00 706/46 |
| 2005/0108384 A1 | 5/2005 | Lambert et al. | |
| 2006/0176822 A1 | 8/2006 | Doyle et al. | |
| 2008/0159289 A1 | 7/2008 | Narayanan et al. | |
| 2009/0240812 A1 | 9/2009 | King et al. | |
| 2010/0235915 A1 | 9/2010 | Memon et al. | |
| 2011/0185422 A1 | 7/2011 | Khayam et al. | |
| 2011/0191455 A1 | 8/2011 | Gardner | |
| 2012/0233311 A1 | 9/2012 | Parker et al. | |
| 2014/0004892 A1 | 1/2014 | Murynets et al. | |
| 2014/0095425 A1 | 4/2014 | Sipple | |
| 2014/0165207 A1* | 6/2014 | Engel | H04L 63/1425 726/25 |
| 2014/0201357 A1 | 7/2014 | Tang et al. | |

OTHER PUBLICATIONS

Tasdemir et al., "Cluster analysis in remote sensing spectral imagery through graph representation and advanced SOM visualization," Proceedings of the 11th Conference on Discovery Science, DS-2008, Budapest, Hungary.
Blondel et al., "Fast unfolding of communities in large networks," Journal of Statistical Mechanics: Theory and Experiment (2008).

\* cited by examiner

METHODS, SYSTEMS, AND COMPUTER PROGRAM PRODUCTS FOR DETECTING COMMUNICATION ANOMALIES IN A NETWORK BASED ON OVERLAP BETWEEN SETS OF USERS COMMUNICATING WITH ENTITIES IN THE NETWORK

CROSS REFERENCE TO RELATED APPLICATIONS

This application claims priority to and is a continuation of U.S. patent application Ser. No. 13/784,410, filed Mar. 4, 2013, now U.S. Pat. No. 9,203,856, issued on Dec 1, 2015, which is hereby incorporated by reference in its entirety.

BACKGROUND

The present disclosure relates generally to computer system and network security and, more particularly, to methods, systems, computer program products for detecting communication anomalies in a network.

Malicious parties are now targeting mobile customers with spam, fraud, and malware. To mitigate such mobile malware, one group of existing techniques primarily focus on the host device (e.g., anti-virus software for mobile devices), but users may not install such protections, and their effectiveness may be limited against new unseen strains of malware. Additionally, host-based protections typically have many inherent issues, such as polymorphic malware, anti-reverse engineering techniques, and purely spam/social engineered attacks that do not install a malicious application. Other techniques currently being used, such as reports that rely on user feedback about spam, volume analysis, and domain blacklists, may have significant weaknesses. While these techniques may be able to detect some individual numbers sending spam, these methods may fail to gain a picture of the entire malware campaign, which typically spans both Short Message Service (SMS) and Internet data with websites setup to defraud users who click on spam links. Also, in the case of malware infections, users may not even be aware of the infection so self reporting fails. Domain blacklists of known malware command and control channels can identify users who are infected, but the malware campaign has to be identified first to know what domains to blacklist in the first place. Attackers tend to use premium short code services to monetize their spam or malware campaign. These short codes, however, are typically hidden behind additional layers in the campaign. Initial spam messages generally send users to a website, which then in turn tricks users into revealing enough information to sign them up for a premium service. In a similar fashion, malware typically has many domains and layers of command and control associated with it before the users see contact with the premium short code.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the disclosure.

Some embodiments provide a method of detecting communication anomalies in a network, comprising detecting communication between a plurality of entities and a set of users in the network, determining an overlap between subsets of the set of users that the entities comprising the plurality of entities communicated with, respectively, and determining whether the communication between the plurality of entities and the set of users is anomalous based on the overlap.

In other embodiments, the method further comprises monitoring communication associated with the plurality of entities during a training period.

In still other embodiments, the plurality of entities comprises domain names, IP addresses, phone numbers, and short codes. The method further comprises removing the domain names that communicated during the training period from the plurality of entities.

In still other embodiments, determining the overlap comprises determining a similarity metric between pairs of the entities comprising the plurality of entities based on the overlap of the subsets of the set of users for each of the pairs, respectively.

In still other embodiments, the method further comprises identifying a cluster of the entities comprising the plurality of entities based on the overlap and the similarity metric.

In still other embodiments, identifying the cluster of the entities comprises excluding the overlap of the subsets of the set of users for each of the pairs of the entities comprising the plurality of entities when the similarity metric for the respective pair is less than a similarity threshold, excluding the overlap of the subsets of the set of users for each of the pairs of the entities comprising the plurality of entities when the overlap is less than a user threshold, and determining a modularity of a graph in which nodes are defined by the plurality of entities and edges between the nodes are defined by the overlap of the subsets of the set of users for each of the pairs of the entities comprising the plurality of entities.

In still other embodiments, determining whether the communication between the plurality of entities and the set of users is anomalous comprises determining that the communication associated with the cluster of the entities is not anomalous when a number of the entities comprising the cluster is less than about three.

In still other embodiments, determining whether the communication between the plurality of entities and the set of users is anomalous comprises determining whether the communication associated with the cluster of the entities is anomalous based on reputations of the entities comprising the cluster.

In still other embodiments, determining whether the communication between the plurality of entities and the set of users is anomalous comprises determining whether the communication associated with the cluster of the entities is anomalous based on operating system types of devices the set of users use to communicate with the entities comprising the cluster.

In still other embodiments, determining whether the communication between the plurality of entities and the set of users is anomalous comprises determining whether the communication associated with the cluster of the entities is anomalous based on Internet protocol addresses the domain names in the cluster resolve to.

In still other embodiments, determining whether the communication between the plurality of entities and the set of users is anomalous comprises determining whether the communication associated with the cluster of the entities is anomalous based on the cluster of entities comprising prepaid phone numbers.

In still other embodiments, determining whether the communication between the plurality of entities and the set of users is anomalous comprises determining whether the communication associated with the cluster of the entities is anomalous based on a number of different countries contacted by the phone numbers in the cluster.

In still other embodiments, determining whether the communication between the plurality of entities and the set of users is anomalous comprises determining whether the communication associated with the cluster of the entities is anomalous based on communication sequences between the set of users and the entities comprising the cluster.

In still other embodiments, determining whether the communication between the plurality of entities and the set of users is anomalous comprises determining whether the communication associated with the cluster of the entities is anomalous based on changes in the plurality of entities comprising the cluster of the entities.

Some embodiments provide a system for detecting communication anomalies in a network comprises a processor and a memory that is coupled to the processor and comprises computer readable program code embodied in the memory that when executed by the processor causes the processor to perform operations comprising: detecting communication between a plurality of entities and a set of users in the network, determining an overlap between subsets of the set of users that the entities comprising the plurality of entities communicated with, respectively, and determining whether the communication between the plurality of entities and the set of users is anomalous based on the overlap.

In still further embodiments, the operations further comprise monitoring communication associated with the plurality of entities during a training period.

In still further embodiments, the plurality of entities comprises domain names, IP addresses, phone numbers, and short codes and the operations further comprise: removing the domain names that communicated during the training period from the plurality of entities. Determining the overlap comprises determining a similarity metric between pairs of the entities comprising the plurality of entities based on the overlap of the subsets of the set of users for each of the pairs, respectively. The operations further comprise identifying a cluster of the entities comprising the plurality of entities based on the overlap and the similarity metric.

Some embodiments provide a computer program product for detecting communication anomalies in a network comprises a tangible computer readable medium comprising computer readable program code embodied in the medium that when executed by a processor causes the processor to perform operations comprising: detecting communication between a plurality of entities and a set of users in the network, determining an overlap between subsets of the set of users that the entities comprising the plurality of entities communicated with, respectively, and determining whether the communication between the plurality of entities and the set of users is anomalous based on the overlap.

In still further embodiments, the operations further comprise monitoring communication associated with the plurality of entities during a training period.

In still further embodiments, the plurality of entities comprises domain names, IP addresses, phone numbers, and short codes and the operations further comprise removing the domain names that communicated during the training period from the plurality of entities. Determining the overlap comprises determining a similarity metric between pairs of the entities comprising the plurality of entities based on the overlap of the subsets of the set of users for each of the pairs, respectively. The operations further comprise identifying a cluster of the entities comprising the plurality of entities based on the overlap and the similarity metric.

Other methods, systems, articles of manufacture, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of exemplary embodiments will be more readily understood from the following detailed description of specific embodiments thereof when read in conjunction with the accompanying drawings, in which.

DETAILED DESCRIPTION

Figure 1:
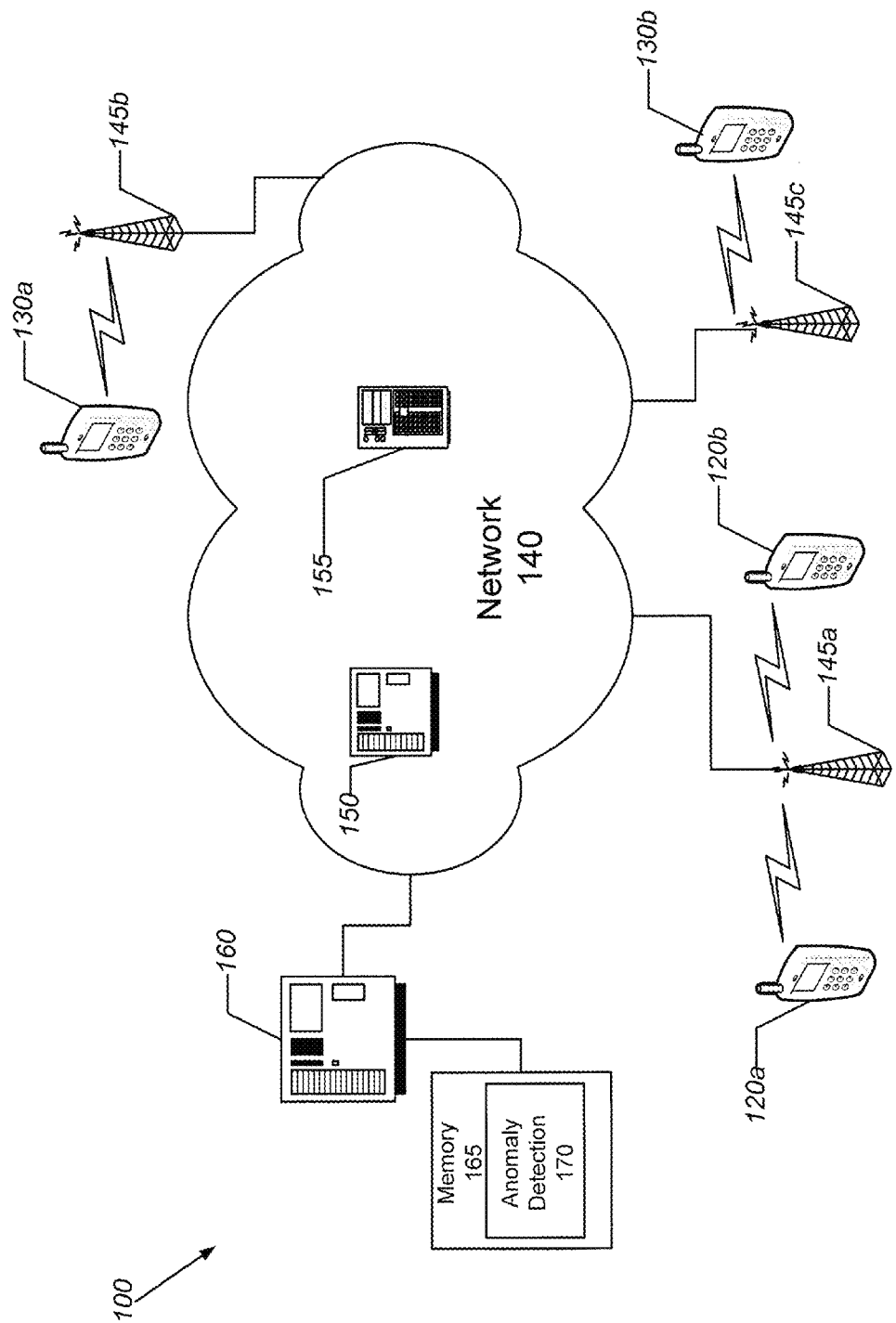
FIG. 1 is a block diagram of a communication network that includes an anomaly detection server to detect communication anomalies in the communication network according to some embodiments.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments may be embodied as methods, systems, and/or computer program products. Accordingly, exemplary embodiments may be embodied in hardware and/or in software (including firmware, resident software, micro-code, etc.). Furthermore, exemplary embodiments may take the form of a computer program product comprising a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

As used herein, an entity may be any construct used to communicate with a user and may include, but is not limited to, phone numbers, domains, IP addresses, and short codes. A user may be represented by a 10-digit phone number, IP address, or the like.

Some embodiments are described herein in the context of detecting malicious campaigns that attack users of mobile devices in a mobile and/or wireless communication network. Such campaigns may be detected by identifying anomalous traffic patterns in network data without having to rely on device-based protections and/or user feedback. Thus, a communication network level approach to detecting and ultimately mitigating the effects of malicious campaigns by detecting communication anomalies in the network may compliment existing defensive techniques based on the end user devices and/or end user feedback. According to some embodiments, communication patterns can be detected at the network level that other defense mechanisms may not be able to detect. Using network information, newly popular SMS numbers, domains, IP addresses, and/or short codes that have recent communication or are associated with recent communication with many users for the first time may be identified. The new popularity and volume are often key attributes of a spam or malware campaign. A clustering operation is then performed on the network entities, which include, but are not limited to, phone numbers, domains, IP addresses, and short codes that share users (i.e., mobile device users in the communication network) in common. In these clusters, initial spam messages, domains that users go to when clicking on spam, other associated domains, IP addresses, and premium short codes used to monetize the malicious campaign can be identified. In addition, legitimate phone numbers, IP addresses, and domains may be eliminated during the clustering process as many legitimate services are stand alone. Additional criteria can be applied to the determined cluster(s) of entities to evaluate whether they are associated with a malicious campaign. Such criteria may include, but are not limited to, reputations of the entities in the cluster (e.g., poor domain reputation, user reported spam, etc.), entropy of the operating system type among the user devices that communicate with the entities in the cluster, number of countries contacted by a phone number, sequences in which users communicate with entities in the cluster, phone numbers being associated with a pre-paid service, number and/or reputation of IP addresses a domain name resolves to over time, and/or stability of a cluster over time (i.e., do entities in the cluster change over time). Based on the identified clusters and any evaluation criteria that may be applied thereto that my indicate the cluster is part of a malicious campaign, an analyst may take mitigating action against the entities in the cluster or may investigate the entities further to determine if they are indeed part of a malicious campaign.

Referring now to FIG. 1, a communication network 100 includes a traffic anomaly detection server 160 that is configured to detect communication anomalies in the network 100 by determining an overlap between the users that the various entities in the communication network communicate with and, based on the overlap of users associated with various entities, determine whether the communication is anomalous. Anomalous communication traffic may be indicative of a malicious campaign by one or more entities in the communication network 100 targeting users of mobile devices. The communication network 100 comprises mobile devices 120a, 120b, 130a, and 130b that communicate with each other and the domain servers 150 and 155 over a network 140. The network 140 may represent a global network, such as the Internet, or other publicly accessible network. The network 140 may also, however, represent a wide area network, a local area network, an Intranet, or other private network, which may not accessible by the general public. Furthermore, the network 140 may represent a combination of public and private networks or a virtual private network (VPN). The network 140 includes wireless base station transceivers 145a, 145b, 145c that may facilitate wireless communication with the mobile devices 120a, 120b, 130a, and 130b. Although shown as single devices, the mobile devices 120a, 120b, 130a, and 130b may represent numerous mobile devices and/or terminals in the network 100. The mobile devices 120a and 120b may represent mobile devices associated with end users while the mobile devices 130a and 130b may represent mobile devices associated with one or more parties that conduct malicious campaigns targeting the mobile devices 120a and 120b associated with end users. The domain servers 150 and 155 may also be associated with one or more parties that conduct malicious campaigns targeting the mobile devices 120a and 120b. The network 140 may include other domain servers that are associated with parties providing legitimate services.

The anomaly detection server 160 is equipped with a memory 165 that is representative of the one or more memory devices containing the software and data used to detect communication anomalies in the network 100. As shown in FIG. 1, the memory 165 may contain an anomaly detection module 170 that is configured to determine an overlap between the users that the various entities in the communication network communicate with and, based on the overlap of users associated with various entities, determine whether the communication is anomalous. The anomaly detection module 170 may be used to detect malicious campaigns launched, for example, by the domain servers 150 and 155 and/or the mobile devices 130a and 130b.

Although FIG. 1 illustrates an exemplary communication network and an exemplary hardware/software architecture that may be used in a data processing system, such as the anomaly detection server 160 for detecting communication anomalies in a communication network, it will be understood that embodiments of the present invention are not limited to such a configuration but are intended to encompass any configuration capable of carrying out operations as described herein.

Computer program code for carrying out operations of data processing systems and servers described above with respect to FIG. 1, such as the anomaly detection server 160, may be written in a high-level programming language, such as Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. Embodiments described herein, however, are not limited to any particular programming language. It will be further appreciated that the functionality of any or all of the program modules may also be implemented using discrete hardware components, one or more application specific integrated circuits (ASICs), or a programmed digital signal processor or microcontroller.

A typical widespread attack in the network 140 has at least two communication components:

The initial infection or lure. The initial attack may occur through the medium of a spam SMS message containing a URL, an app store, or perhaps a hacked website. These websites may serve anything from drive-by download malware attempting to infect phones to social engineering attempts to trick a user into voluntarily downloading malware or signing up for a premium rate SMS service under false pretenses.

The subsequent behavior of those users that get infected or fall for the attack. This might include communicating with a command and control server/drop-server, or an SMS short code, relaying all SMS messages to a certain phone number, or perhaps acting as an SMS spammer itself.

An observation is that each entity in an attack (phone numbers for sending SMS messages, domain names, premium numbers (e.g., short codes), IP addresses, etc.) cost money to the attacker. Therefore, it can be expected that the attacker will reuse each component for several attack attempts. This implies that a new attack campaign will result in the formation of a new (and therefore anomalous, compared to past traffic) communication pattern involving communication between the victims and one or more malicious entities controlled by the attacker. Unfortunately, a single entity creating new anomalous traffic links may not be sufficient to detect malicious attacks, because benign services (e.g., a new mobile app) also behave in a similar manner. Malicious campaigns are often set apart by the following characteristics:

There is typically more than one entity involved in a campaign, e.g. a 10-digit number that sends a URL in an SMS spam, and the domain name in the URL.

The entities involved often change over time. This is because some of the entities may have complaints filed against them and are taken down. But the attacker often simply begins using a new entity of the same type. For example, if a mobile phone number is reported to be sending spam and is closed down, then the attacker can simply start sending spam from another number.

Figure 2:
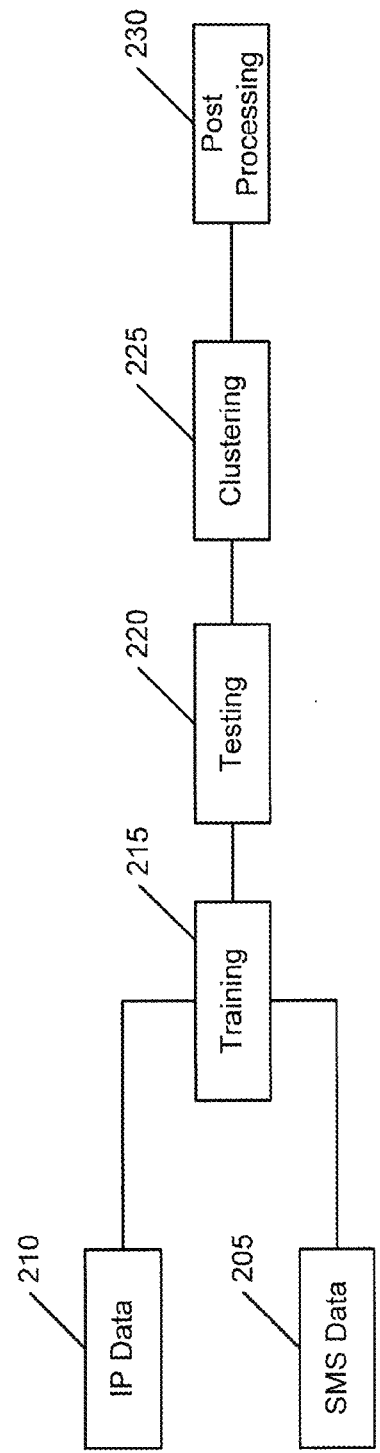
FIG. 2 is a block diagram that illustrates operations for detecting communication anomalies in a communication network according to some embodiments.

Based on the above two insights, a specific type of anomalous pattern may be detected: the existence of multiple entities that have recently become very popular (i.e. they have recently begun communicating with a large number of users), and are also related to one another via a non-trivial overlap between the sets of users they communicate with. FIG. 2 is a block diagram that illustrates a high level overview of exemplary operations involved in detecting suspicious clusters of entities involved in an attack according to some embodiments. Operations in this chain may winnow down the data, keeping anomalous traffic and dropping irrelevant traffic, until it is small enough for an analyst to investigate. First, data and users are matched in both data sets (SMS block 205 and IP block 210) to have a picture of the traffic for these users, because many attack campaigns involve traffic in both the SMS and IP worlds. Then, using data from an initial time window (block 215), domains, IP addresses, and numbers that are already popular may be identified. In the testing phase (block 220), which corresponds to a subsequent time window, these already popular entities are excluded, and how many and which distinct users each entity communicates with are identified. The most popular of these entities are selected and a calculation is made with respect to how many users each pair of entities has in common. In this way patterns can be inferred that indicate similar sets of users connecting to multiple newly popular entities. Using the overlap between the sets of users that communicate with each newly popular entity, the entities are clustered together using a graph clustering algorithm (block 225). A cluster of entities is the final canonical unit of suspicion for being perpetrators of a malicious campaign in the network 140.

Post processing may be performed on the cluster(s) to examine the entities comprising the cluster(s) to determine whether the entity is part of a malicious campaign or provides a legitimate service (block 230). The post processing may include applying additional criteria to the determined cluster(s) of entities to evaluate whether they are associated with a malicious campaign. Such criteria may include, but are not limited to, reputations of the entities in the cluster (e.g., poor domain reputation, user reported spam, etc.), entropy of the operating system type among the user devices that communicate with the entities in the cluster, number of countries contacted by a phone number, sequences in which users communicate with entities in the cluster, phone numbers being associated with a pre-paid service, number and/or reputation of IP addresses a domain name resolves to over time, and/or stability of a cluster over time (i.e., do entities in the cluster change over time).

Exemplary operations associated with the functional blocks of FIG. 2 will now be described in more detail hereafter. The raw data may include anonymized call detail records (CDR) for SMS messages (block 205) and IP data belonging to a tier-1 cellular carrier (block 210).

Each record in CDR data may be a time-stamped tuple indicating the source and destination phone number. Here, a phone numbers can be either a 10-digit numbers or a short code (used for SMS based services such as checking train times, movie times, horoscope, etc.). In each record, either the source or the destination (or both) must be subscribers of the carrier. Due to volume constraints, only a uniform random sample over all devices may be used. IP data, also uniformly randomly sampled, consists of time stamped tuples indicating the 10-digit phone number and the 2nd level domain name visited. To focus on data-enabled phones, CDR data for users that have at least one record in IP data are used.

To identify anomalous traffic pattern the IP data and SMS data are divided into two parts by time: a training phase (block 215) and a testing phase (block 220). For example, the training phase may last for approximately one month while the testing phase lasts for a sliding window duration of ten days, which occurs after the training phase ends. According to some embodiments, the following operations may be performed in the training phase (block 315):

Domain names and IP addresses: all domains and IP addresses that appear in the training window are dropped from the test data; and [0054] 10-digit numbers and short codes: only a select whitelist of known benign services (gateways, etc.) is whitelisted. All other numbers are kept as is.

While the latter does not remove benign entities that communicate with many users, the rationale for this is that it is not expected for high degree benign entities to form clusters of significant size with other entities. Therefore, keeping almost all numbers allows for the retention of both types of entities, benign and malicious. In other embodiments, the training interval may include other techniques for identifying entities as normal or potentially anomalous. For example, domain names and IP addresses that are seen X number of times during a training period may be remove from the test data set as being normal. Short codes and/or SMS numbers seen during the training period at least recently enough that they could not have been resold to new users may also be removed from the test data set as being normal. Other techniques to identify normal and anomalous entities may focus on specific connections rather than total counts.

During the testing phase (block 220) the entities identified in the training phase as normal are dropped from the test dataset, and the remaining entities are used to compute a mutual contacts graph where entities are represented as nodes in the graph and edges represent overlap between the sets of users the pair of entities communicate with. A motivation behind building the mutual contacts graph is that the users that end up connecting to a later part of an attack campaign such as a fraudulent premium number or botnet command and control may also have connected to the same prior part of the attack campaign like receiving a spam SMS from the same number. In this way the number sending spam to the websites and premium numbers involved in the conversion steps of the same attack campaign can be linked. Due to memory and processor considerations, nodes that are not considered "high-degree" nodes are removed from the mutual contacts graph. The top K nodes based on the number of users the nodes interact with are selected as the high-degree nodes with the remaining nodes being considered lower degree nodes, which are discarded from the mutual contacts graph.

In building the mutual contacts graph, the relationships between these anomalous nodes having communication contact with users are analyzed. Specifically, the Dice association coefficient is computed between every pair of nodes. The Dice association coefficient D(a,b) between two nodes a and b is defined as:

$$D(a,b)=\min|AB|/\min\{|A|,|B|\}$$

where A and B represent the set of users that communicate with nodes A and B respectively, and |.cndot.| represents the cardinality of a set. D(a,b) is similar to the Jaccard similarity between two sets of items, but is more suited as measure for the similarity between two entities according to the present embodiments. This is because Jaccard similarity fails to convey the relationship when one entity communicates with a relatively small set of users compared to the other.

The clustering phase (block 225) involves partitioning the mutual contacts graph into clusters, such that each cluster represents a suspicious group of entities acting in concert. Edges in the mutual contacts graph are weighted by the Dice association coefficient as described above. The graph is partitioned in two stages: First any edges that have a Dice coefficient of less than a coefficient or similarity threshold, or have an absolute number of shared users of less than a user threshold are broken. These thresholds generally represent the 99th percentile over all edges in the mutual contacts graph. It will be further understood that while the Dice association coefficient is one approach to measuring similarity, other comparisons may also be used, such as standard set comparisons and hard thresholds in accordance with other embodiments. Different set comparisons may also be used based on the size of the sets involved or multiple set comparisons may be performed along with averaging, for example.

Then, using the work of Blondel et al., graph clustering on the remaining graph is performed to optimize a quantity called modularity, where the modularity of a graph partition is a scalar value between −1 and 1 that measures the density of links inside clusters as compared to links between clusters. Thus it finds high modularity partitions of graphs to split clusters that would otherwise only have a weak link between two highly connected groups of nodes. The nodes remaining connected to each other after this process form each of the final clusters that are targets for further evaluation as comprising entities that are malicious actors.

Figure 3:
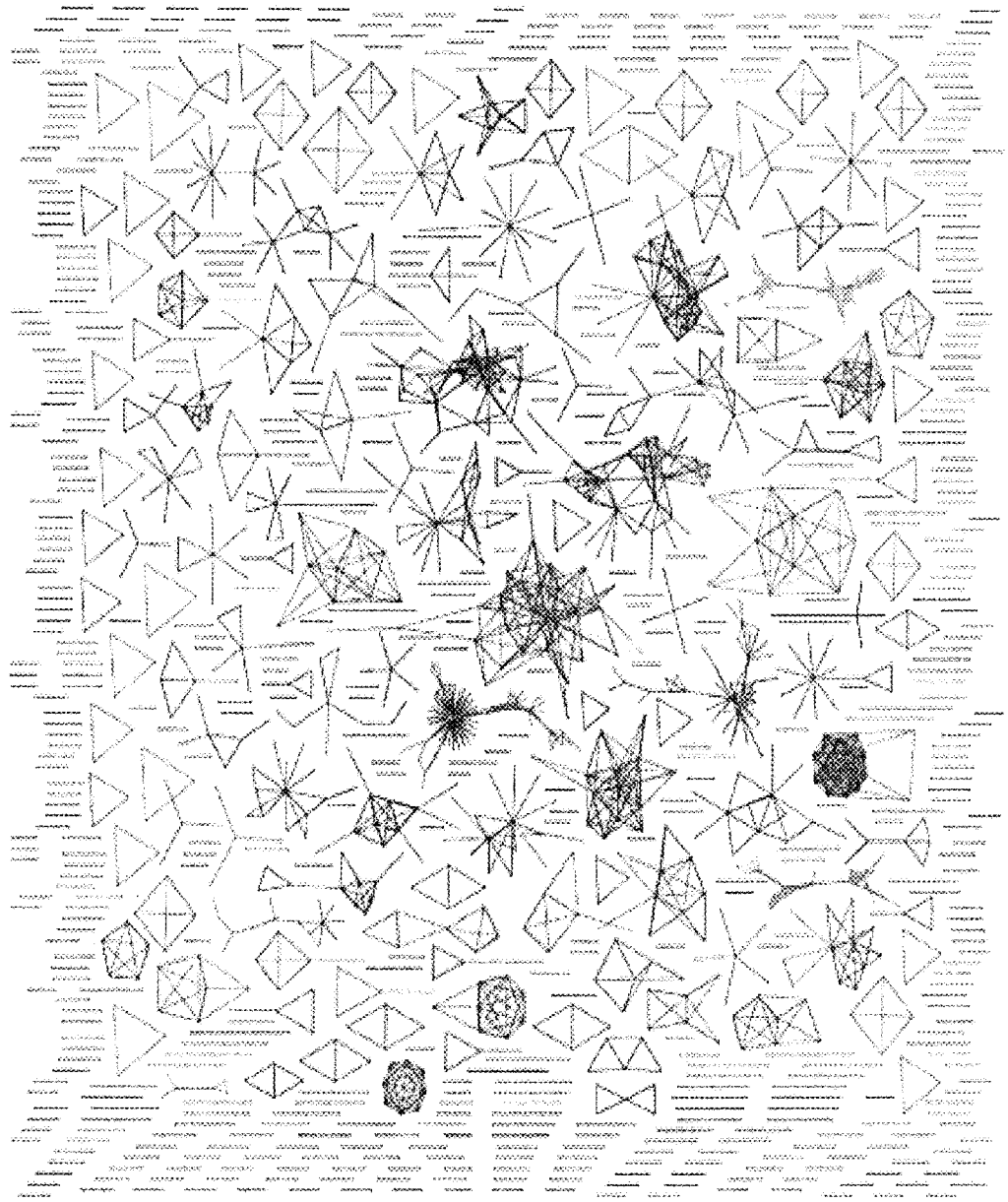
FIG. 3 illustrates an example of a resulting graph partition of a mutual contacts graph of anomalous entities according to some embodiments.

FIG. 3 shows an example of a resulting graph partition of a mutual contacts graph of anomalous entities. Most clusters are of size 2 or 3. In some embodiments, clusters of size .ltoreq.3 may be discarded because generally a cluster of such a small size does not correspond to malicious campaigns.

Post processing may be performed on the cluster(s) to examine the entities comprising the cluster(s) to determine whether the entity is part of a malicious campaign or provides a legitimate service (block 230). Three specific criteria that may be used to evaluate entities in a cluster to determine whether they may be associated with a malicious campaign will now be described.

1) Temporal traffic pattern: The temporal traffic pattern of nodes in a cluster can provide information on whether it is likely to correspond to a programmed event or show (and therefore a benign cluster). For example, if traffic associated with an entity peaks at a specific time once a week and corresponds to a popular TV show involving SMS voting, then the entity may be benign and associated with the popular TV show. This pattern by itself cannot be used to label a cluster as absolutely benign as a similar pattern may be used by a malicious campaign, such as data exfiltration only at night time or periodic botnet command and control, but it may assist in directing an investigation of a particular entity.

2) Label known malicious nodes: As attackers typically use domains, IP addresses, 10-digit numbers, and premium short codes for many attack attempts, and these components of widespread attacks are generally eventually detected, labeling clusters using data from existing blacklists can give analysts important clues about the nature of a cluster (benign/malicious). Blacklists complement the embodiments described herein by providing some partial ground truth. A potential weakness of blacklists, namely that they lag behind other detection methods and provide no relationship between malicious nodes, is complemented by the clusters generated according to some embodiments, which can group a large part of an attack campaign while quantifying the relationship between abnormal nodes. A variety of different blacklists may be used.

3) Cluster size and change over time: The size of a cluster and whether it changes in composition over time can provide important clues into whether it is malicious. This is because malicious campaigns frequently need to put new numbers, IP addresses, and domain names into use as old ones get taken down or blacklisted. On the other hand, legitimate services are more likely to keep the same domains and numbers as users become familiar with them. Clusters from a given window in time can be compared with clusters from a previous test window to highlight clusters that evolve over time. A new cluster may be a cluster that has no overlap with any clusters in a previous sliding window. Similarly, an obsolete cluster is one that has no overlap with any clusters in the next test window. Any clusters that have non-zero overlap with any cluster in the previous window are active clusters, which means the nodes in those clusters are nodes with a significant amount of end users regularly communicating with them. For active clusters, the similarity between two versions of the same cluster in different test windows can be measured using the Jaccard similarity coefficient.

In addition to temporal traffic pattern analysis, labeling known malicious nodes, and analyzing changes in cluster size over time, other criteria may be used during the post processing phase (block 230) to evaluate the potential that the entities in a cluster are malicious. Such criteria may include, but are not limited to, entropy of the operating system type among the user devices that communicate with the entities in the cluster, number of countries contacted by a phone number, sequences in which users communicate with entities in the cluster, phone numbers being associated with a pre-paid service, number and/or reputation of IP addresses a domain name resolves to over time.

Exemplary embodiments are described herein with reference to flowchart and/or block diagram illustrations of methods, systems, and computer program products in accordance with exemplary embodiments. These flowchart and/or block diagrams further illustrate exemplary operations for authenticating the identity of a user by combining multiple authentication techniques to generate a composite numerical confidence indicator of the identity of the user, in accordance with some embodiments. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means and/or circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 4:
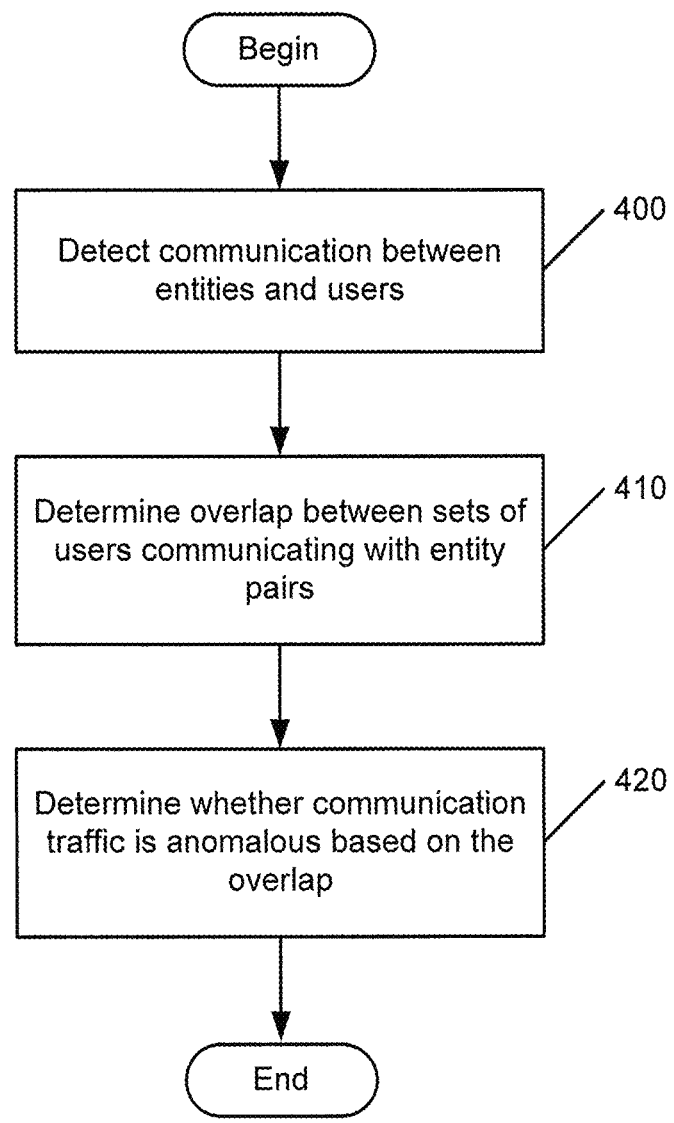
FIG. 4 is a flowchart that illustrates operations for detecting communication anomalies in a communication network according to some embodiments.

Referring now to FIG. 4, exemplary operations for detecting communication anomalies in a communication network begin at block 400 where communication between a plurality of entities and a set of users in a network is detected. At block 410, overlap(s) are detected between pairs of the plurality of entities with regard to the sets of users (i.e., mobile devices associated with end users) that the entities communicated with. A determination may be made whether the communication between the entities and the set of users is anomalous based on the overlap at block 420.

The flowchart of FIG. 4 illustrates the architecture, functionality, and operations of some embodiments of methods, systems, and computer program products for detecting communication anomalies in a communication network. In this regard, each block represents a module, segment, or portion of code, which comprises one or more executable instructions for implementing the specified logical function(s). It should also be noted that in other implementations, the function(s) noted in the blocks may occur out of the order noted in FIG. 4. For example, two blocks shown in succession may, in fact, be executed substantially concurrently or the blocks may sometimes be executed in the reverse order, depending on the functionality involved.

According to some embodiments described above, anomalous communication may be detected in a network between various types of entities and the mobile devices associated with end users. The entities associated with the anomalous communication activity may be actors in a malicious campaign. The embodiments described above may save analysts time by more clearly showing the links between different aspects of a spam/malware campaign. Preventing spam, malware campaigns, botnets, and premium number fraud may provide both direct and indirect benefits, ranging from better user perceptions of the network to direct monetary benefit from not paying fraudulent premium numbers.

Many variations and modifications can be made to the embodiments without substantially departing from the principles of the present invention. All such variations and modifications are intended to be included herein within the scope of the present invention, as set forth in the following claims.

What is claimed is:

1. A system, comprising:
   a memory that stores instructions; and
   a processor that executes the instructions to perform operations, the operations comprising:
   determining an overlap between subsets of a set of users that entities of a plurality of entities communicated with, respectively, wherein the plurality of entities comprise domain names;
   identifying, based on the overlap and based on a similarity metric between pairs of the entities of the plurality of entities, a cluster of the entities of the plurality of entities; and determining whether communication between the cluster of the entities and the set of users is anomalous based on the overlap, wherein determining whether the communication between the cluster of the entities and the set of users is anomalous comprises:
    determining whether the communication associated with the cluster of the entities is anomalous based on a number of internet protocol addresses each of the domain names in the cluster of the entities resolves to over a time period; and
    determining whether the communication associated with the cluster of entities is anomalous based on a sequence in which users of the set of users communicate with the cluster of the entities.

2. The system of claim 1, wherein the operations further comprise detecting the communication between the cluster of the entities and the set of users.

3. The system of claim 1, wherein the operations further comprise determining, based on the overlap of the subsets of the set of users for each of the pairs, respectively, the similarity metric between the pairs of the entities of the plurality of entities.

4. The system of claim 1, wherein the operations further comprise matching short messaging service data and internet protocol data from the communication with the users of the set of users.

5. The system of claim 1, wherein the operations further comprise determining whether the communication between the cluster of the entities and the set of users is anomalous based on an operating system type of a device utilized to communicate with the cluster of the entities.

6. The system of claim 1, wherein the operations further comprise determining whether the communication between the cluster of the entities and the set of users is anomalous based on a reputation of the entities in the cluster.

7. The system of claim 1, wherein the operations further comprise determining whether the communication between the cluster of the entities and the set of users is anomalous based on a stability of the cluster of the entities over time.

8. The system of claim 1, wherein the operations further comprise determining whether the communication between the cluster of the entities and the set of users is anomalous based on the cluster of the entities comprising phone numbers.

9. The system of claim 1, wherein the operations further comprise determining that the communication between the cluster of the entities and the set of users is not anomalous when a quantity of the entities in the cluster is less than a threshold.

10. The system of claim 1, wherein the operations further comprise determining whether the communication between the cluster of the entities and the set of users is anomalous based on changes in the entities in the cluster.

11. The system of claim 1, wherein the operations further comprise comparing the cluster of the entities of the plurality of entities to a new cluster of the entities of the plurality of entities.

12. The system of claim 1, wherein the operations further comprise labeling the cluster for a blacklist if the communication between the cluster of the entities and the set of users is determined to be anomalous.

13. A method, comprising:
    determining, by utilizing instructions from a memory that are executed by a processor, an overlap between subsets of a set of users that entities of a plurality of entities communicated with, respectively, wherein the plurality of entities comprise domain names;
    identifying, based on the overlap and based on a similarity metric between pairs of the entities of the plurality of entities, a cluster of the entities of the plurality of entities; and
    determining whether communication between the cluster of the entities and the set of users is anomalous based on the overlap, wherein determining whether the communication between the cluster of the entities and the set of users is anomalous comprises:
        determining whether the communication associated with the cluster of the entities is anomalous based on an operating system type of a device utilized to communicate with the cluster of the entities; and
        determining whether the communication associated with the cluster of entities is anomalous based on a sequence in which users of the set of users communicate with the cluster of the entities.

14. The method of claim 13, further comprising determining whether the communication between the cluster of the entities and the set of users is anomalous based on a number of internet protocol addresses each of the domain names in the cluster of the entities resolves to over a time period.

15. The method of claim 13, further comprising determining, based on the overlap of the subsets of the set of users for each of the pairs, respectively, the similarity metric between the pairs of the entities of the plurality of entities.

16. The method of claim 13, further comprising determining that the communication between the cluster of the entities and the set of users is not anomalous when a quantity of the entities in the cluster is less than a threshold.

17. The method of claim 13, further comprising determining whether the communication between the cluster of the entities and the set of users is anomalous based on a number of countries contacted by phone numbers in the cluster.

18. The method of claim 13, further comprising labeling the cluster for a blacklist if the communication between the cluster of the entities and the set of users is determined to be anomalous.

19. The method of claim 13, further comprising determining whether the communication between the cluster of the entities and the set of users is anomalous based on a stability of the cluster of the entities over time.

20. A non-transitory computer-readable medium comprising instructions, which when loaded and executed by a processor, cause the processor to perform operations, the operations comprising:
    determining an overlap between subsets of a set of users that entities of a plurality of entities communicated with, respectively, wherein the plurality of entities comprise domain names;
    identifying, based on the overlap and based on a similarity metric between pairs of the entities of the plurality of entities, a cluster of the entities of the plurality of entities; and
    determining whether communication between the cluster of the entities and the set of users is anomalous based on the overlap, wherein determining whether the communication between the cluster of the entities and the set of users is anomalous comprises:
        determining whether the communication associated with the cluster of the entities is anomalous based on an operating system type of a device utilized to communicate with the cluster of the entities; and determining whether the communication associated with the cluster of entities is anomalous based on a stability of the cluster of the entities over time.

* * * * *